United States Patent
Gallier (10) Patent No.: US 12,286,901 B2
(45) Date of Patent: Apr. 29, 2025

(54) TURBINE ENGINE COMPONENT WITH DEFLECTOR

(71) Applicant: General Electric Company, Schenectady, NY (US)

(72) Inventor: Kirk D. Gallier, Cincinnati, OH (US)

(73) Assignee: General Electric Company, Evandale, OH (US)

( * ) Notice: Subject to any disclaimer, the term of this patent is extended or adjusted under 35 U.S.C. 154(b) by 103 days.

(21) Appl. No.: 17/468,834

(22) Filed: Sep. 8, 2021

(65) Prior Publication Data

US 2022/0106884 A1 Apr. 7, 2022

Related U.S. Application Data

(63) Continuation of application No. 15/622,643, filed on Jun. 14, 2017, now Pat. No. 11,149,555.

(51) Int. Cl.
| | |
|---|---|
| *F01D 5/18* | (2006.01) |
| *F01D 5/14* | (2006.01) |
| *F01D 9/02* | (2006.01) |
| *F01D 25/12* | (2006.01) |

(52) U.S. Cl.
CPC ............. *F01D 5/186* (2013.01); *F01D 5/147* (2013.01); *F01D 5/187* (2013.01); *F01D 9/02* (2013.01); *F01D 25/12* (2013.01); *F05D 2220/30* (2013.01); *F05D 2240/126* (2013.01); *F05D 2250/13* (2013.01); *F05D 2250/23* (2013.01); *F05D 2260/202* (2013.01); *F05D 2260/221* (2013.01)

(58) Field of Classification Search
CPC .......... F01D 5/186; F01D 5/147; F01D 5/187; F01D 9/02; F01D 25/12; F05D 2220/30; F05D 2240/126; F05D 2250/13; F05D 2250/23; F05D 2260/202; F05D 2260/221
See application file for complete search history.

(56) References Cited

U.S. PATENT DOCUMENTS

| | | | |
|---|---|---|---|
| 4,514,144 A | * | 4/1985 | Lee .................... F01D 5/187 416/97 R |
| 4,820,122 A | | 4/1989 | Hall et al. |
| 5,472,316 A | * | 12/1995 | Taslim ............... F01D 5/187 416/97 R |
| 5,624,231 A | | 4/1997 | Ohtomo et al. |
| 5,700,131 A | | 12/1997 | Hall et al. |
| 5,797,726 A | | 8/1998 | Lee |
| 6,474,947 B1 | | 11/2002 | Yuri |
| 6,932,568 B2 | | 8/2005 | Powis et al. |
| 7,300,251 B2 | | 11/2007 | Kitamura et al. |

(Continued)

FOREIGN PATENT DOCUMENTS

EP 1111190 A1 6/2001

*Primary Examiner* — Courtney D Heinle
*Assistant Examiner* — Andrew Thanh Bui
(74) *Attorney, Agent, or Firm* — McGarry Bair PC (57) ABSTRACT

An apparatus and method for a turbine engine for can include an engine component. The engine component can include an interior cooling passage at least partially defining a cooling circuit for passing a flow of cooling fluid through the component. Film holes provide for exhausting a portion of the cooling fluid to an exterior of the component, to form a cooling film along an exterior hot surface of the engine component. A deflector can be position within the cooling passage upstream form the film hole.

15 Claims, 10 Drawing Sheets

(56) References Cited

U.S. PATENT DOCUMENTS

| | | |
|---|---|---|
| 7,347,671 B2 | 3/2008 | Dorling et al. |
| 7,578,178 B2 | 8/2009 | Boyer et al. |
| 8,083,485 B2 | 12/2011 | Chon et al. |
| 8,182,221 B1 | 5/2012 | Liang |
| 8,628,293 B2 | 1/2014 | Ramachandran et al. |
| 8,695,683 B2 | 4/2014 | Albert et al. |
| 8,757,974 B2 | 6/2014 | Phopheter-Hinckley et al. |
| 9,376,919 B2 | 6/2016 | Fujimoto |
| 9,388,700 B2 * | 7/2016 | Propheter-Hinckley .................... F01D 5/187 |
| 9,896,942 B2 | 2/2018 | Shepherd |
| 9,920,635 B2 * | 3/2018 | Bommisetty ........... F01D 5/187 |
| 10,830,051 B2 * | 11/2020 | Bunker ................... F01D 25/12 |
| 10,830,060 B2 * | 11/2020 | Clark ...................... F01D 5/187 |
| 2016/0069194 A1 * | 3/2016 | Bommisetty ........... F01D 5/187 29/889.721 |
| 2016/0069566 A1 | 3/2016 | Numata et al. |
| 2016/0251966 A1 | 9/2016 | Bunker et al. |

\* cited by examiner

TURBINE ENGINE COMPONENT WITH DEFLECTOR

CROSS-REFERENCE TO RELATED APPLICATIONS

This Application is a continuation of and claim priority to U.S. patent application Ser. No. 15/622,643 filed on Jun. 14, 2017, now U.S Pat. No. 11,149,555, which is incorporated herein by reference in its entirety.

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade. The cooling circuits can include one or more airflow element to enhance the cooling, however, such elements can lead to excessive collection of dust or particulate matter reducing service life or requiring additional maintenance.

BRIEF DESCRIPTION OF THE INVENTION

In one aspect, the present disclosure relates to an airfoil for a turbine engine, the airfoil comprising: an outer wall bounding an interior, the outer wall defining a pressure side and a suction side extending axially between a leading edge and a trailing edge defining a chord-wise direction and extending radially between a root and a tip defining a span-wise direction; a cooling passage located in the interior space and at least partially defining a cooling circuit; a film hole extending through the outer wall having an inlet provided on the inner surface and an outlet provided on the outer surface; and a deflector having a deflector height and provided in the cooling passage, wherein at least a portion of the deflector is spaced from the outer wall.

In another aspect, the present disclosure relates to a blade for a turbine engine, the blade comprising: an outer wall bounding an interior; a cooling passage extending along the interior; a rib extending into the interior from the outer wall, at least partially defining the cooling passage, and defining a corner at the junction with the outer wall; a film hole extending through the outer wall having an inlet provided at the cooling passage and an outlet; and a deflector having a deflector height and positioned in the cooling passage, wherein at least a portion of the deflector is spaced from the outer wall.

In yet another aspect, the present disclosure relates to a method of cooling an airfoil for a turbine engine, the method comprising: providing a volume of air to a cooling passage within an interior of the airfoil, the interior defined by an outer wall; deflecting, with a deflector, the volume of air within the cooling passage; and exhausting the deflected air via a cooling hole; wherein at least a portion of the deflector is spaced from the outer wall.

DETAILED DESCRIPTION OF THE INVENTION

Aspects of the disclosure described herein are directed to airflow deflectors provided within an airfoil blade. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications. Similarly, the aspects as described herein will have equal applicability to other engine components having film cooling and are not limited to airfoils or blades alone.

As used herein, the term "forward" or "upstream" refers to moving in a direction nearer to an origin of a flow of fluid relative to the direction of the local flow of fluid, such as air, or toward the engine inlet, or a component being relatively closer to the engine inlet as compared to another component.

The term "aft" or "downstream" used in conjunction with "forward" or "upstream" refers to a direction further from an origin of a flow of fluid relative to the direction of the local flow of fluid, such as air, or toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
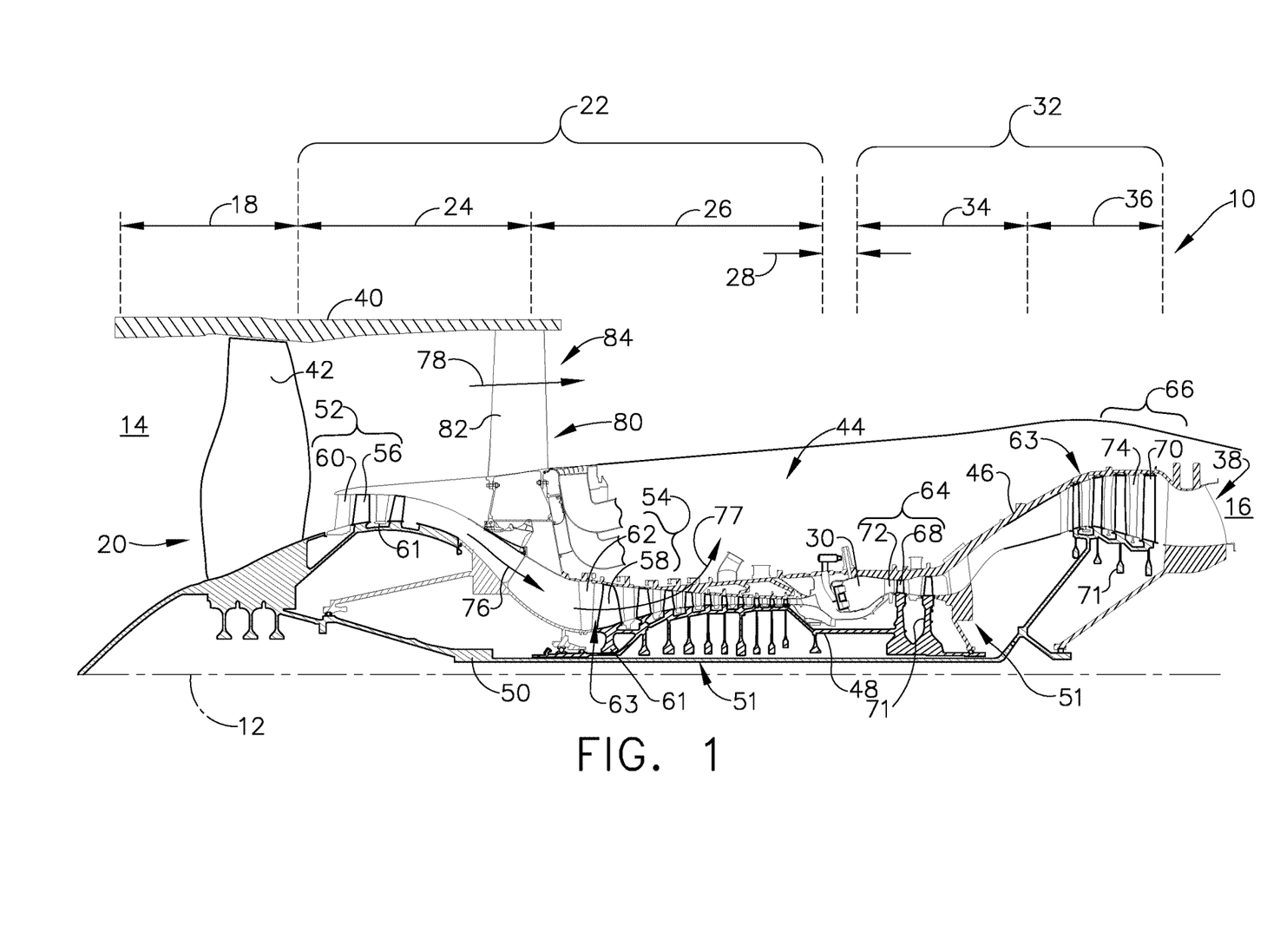
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
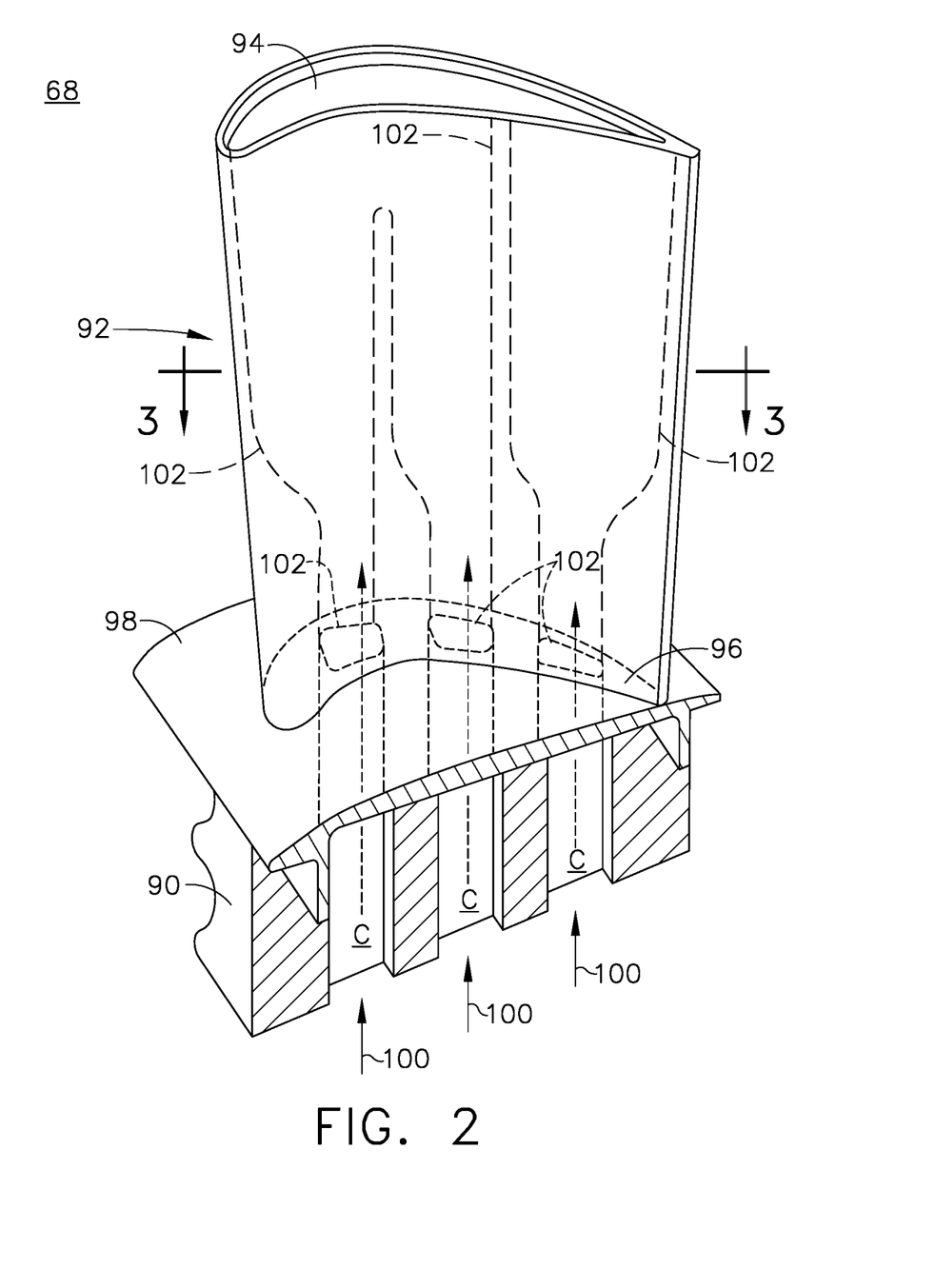
FIG. 2 is a perspective view of an airfoil of the gas turbine engine of FIG. 1 including interior cooling passages.

FIG. 2 is a perspective view of an engine component in the form of one of the turbine blades 68 of the engine 10 from FIG. 1. The turbine blade 68 includes a dovetail 90 and an airfoil 92. The airfoil 92 includes a tip 94 and a root 96 defining a span-wise direction therebetween. In the case of a stationary vane or nozzle, the tip 94 can be the furthest radial extent of the airfoil 92. The airfoil 92 mounts to the dovetail 90 at a platform 98 at the root 96. The platform 98 helps to radially contain the turbine engine mainstream airflow. The dovetail 90 can be configured to mount to a turbine rotor disk 71 on the engine 10 of FIG. 1. The dovetail 90 further includes at least one inlet passage 100, exemplarily shown as a three inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90.

The airfoil 92 can include one or more interior cooling passages 102 extending substantially in the span-wise direction from the root 96 to the tip 94, while any orientation is contemplated. The cooling passages 102 can extend partially or fully through the airfoil 92, and can interconnect with one another.

Figure 3:
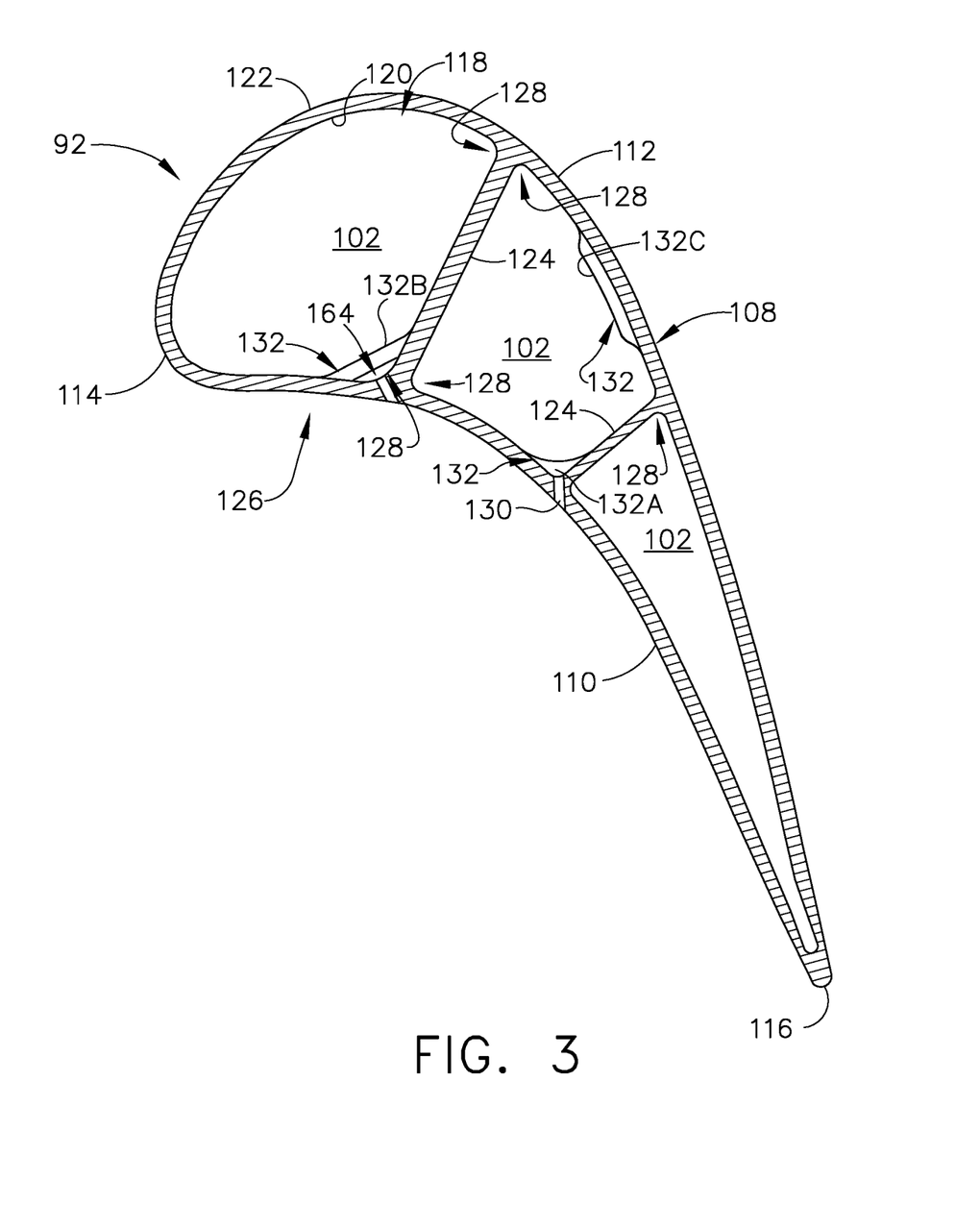
FIG. 3 is a cross-sectional view of the airfoil of FIG. 2 taken across section 3-3 illustrating deflectors provided within corners of the cooling passages.

Referring to FIG. 3, the airfoil 92 is shown in cross section taken along section 3-3 of FIG. 2 and includes an outer wall 108 including a concave-shaped pressure side 110 and a convex-shaped suction side 112 which are joined together to define the shape of the airfoil 92. The airfoil 92 includes a leading edge 114 and a trailing edge 116, defining a chord-wise direction. The airfoil 92 has an interior 118 defined by the outer wall 108. The outer wall 108 further includes an inner surface 120 facing the interior 118 and an outer surface 122 facing the exterior of the airfoil 92. In operation, the blade 68 rotates in a direction such that the pressure side 110 follows the suction side 112 in response to a main airflow passing through the turbine engine. Thus, as shown in FIG. 3, the airfoil 92 would rotate upward toward the top of the page. In the case of a stationary vane as the engine component, the airfoil 92 would not rotate.

One or more interior walls shown as ribs 124 can divide the interior 118 into multiple cooling passages 102, which can extend in the substantially span-wise direction. For example, the cooling passages 102 can extend partially or fully from the root 96 to the tip 94 (FIG. 2). The cooling passages 102 can fluidly couple to one another, or to other airflow structures within the airfoil 92, to form a cooling circuit 126. Typically, most cooling passages 102 will be separated from one another, and are not fluidly coupled. As such, multiple cooling circuits 126 can be formed within the interior 118 of the airfoil 92. The junction of the ribs 124 at the outer wall 108 can form corners 128. The corners 128 need not be sharp, and can be rounded or radiused as illustrated, or can be any such junction between a rib 124 and the outer wall 108.

It should be appreciated that the ribs 124 and passages 102 defining the cooling circuit 126 as shown are exemplary, and can be single channels extending in the span-wise direction, or can alternatively be complex cooling circuits, having multiple features such as passages, channels, inlets, pin banks, circuits, sub-circuits, film holes, plenums, mesh, turbulators, or otherwise and can extend in any direction or have any geometry.

One or more film holes 130 can be formed in the outer wall 108. The film holes 130 can be positioned in the corners 128, in one example. One or more deflectors 132 can be provided in the cooling passages 102 adjacent to and upstream of the film holes 130. It should be appreciated that the film holes 130 and deflectors 132 are non-limiting as shown. Any number of film holes 130 or deflectors 132 can be utilized in any position within the outer wall 108 and the cooling passages 102, respectively. The deflectors 132, being positioned upstream of the film hole 130, deflect a flow of fluid within the airfoil 92 away from a nearby film hole 130, while generating little to no turbulence in deflecting the flow of fluid in order to prevent a cross-flow across the film holes 130. In comparison, a turbulator within an airfoil or engine component is intended to generate an increased turbulence for a flow of fluid.

The deflectors 132 can be a corner deflector 132A, a floating corner deflector 132B, or a wall deflector 132C. The corner deflector 132A is disposed in a corner 128 and fully coupled to the outer wall 108 and the rib 124. The floating corner deflector 132B couples to the rib 124 and the outer wall 108, and is spaced from the corner 128 by a gap 164. The wall deflector 132C is provided along the inner surface 120 of the outer wall 108 and spaced from the ribs 124. It is also contemplated that the wall deflector 132C can be positioned on the ribs 124 or other interior structures adjacent interior hole structures. The deflectors 132A-132C should be understood as non-limiting, and other deflectors 132 are possible. Furthermore, the airfoil 92 as shown in FIG. 3 is non-limiting, and different airfoil 92 configurations can require different deflectors 132. An airfoil or engine component can have more or less deflectors 132, and can include just one type of deflector 132 or multiple types of deflectors 132.

Figure 4A:
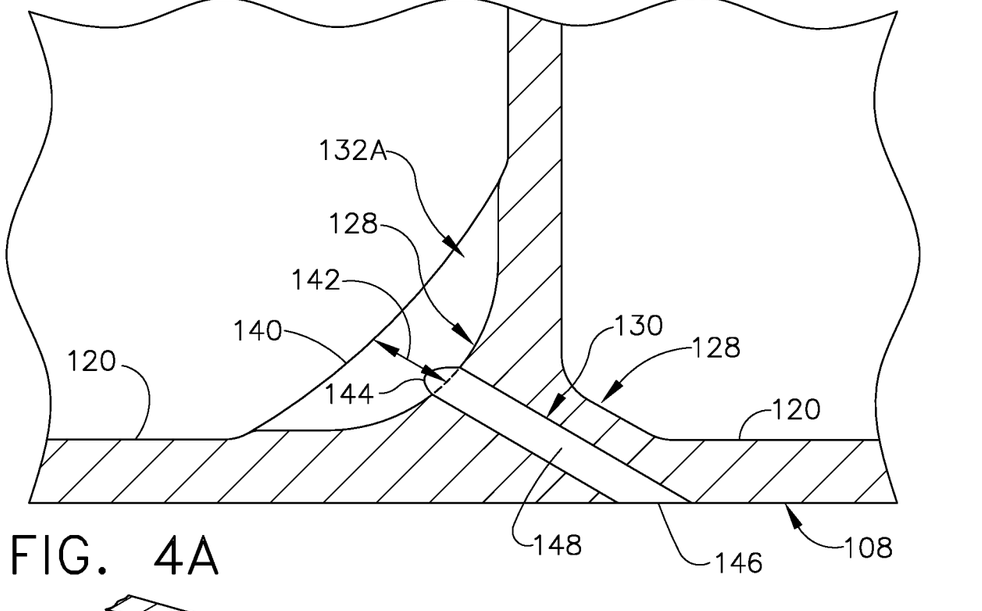
FIG. 4A is a top view of a corner deflectors within one cooling passage of FIG. 3.

Referring now to FIG. 4A, a top-down view of the corner deflector 132A of FIG. 3 is shown. The corner deflector 132A can have an outer surface 140. The outer surface 140 can be rounded, in one non-limiting example, while it is contemplated that it can be flat, ramped, or angled in additional non-limiting examples. The corner deflector 132A, as well as all deflectors 132 described herein, can have a deflector height 142. The deflector height 142 of the corner deflector 132A can be defined as the greatest distance between the corner 128 and the outer surface 140, measured perpendicular to the corner 128 or the outer surface 140.

Each film hole 130 includes an inlet 144 and an outlet 146 defining a passage 148 therebetween. The inlet 144 can positioned on the inner surface 120 of the outer wall 108 near the deflector 132 and the outlet 146 can be provided on the outer surface 122 of the outer wall 108. Positioning the film holes 130 in the corners 128 provides for an elongated passage 148, which can improve directionality of the film hole 130.

Figure 4B:
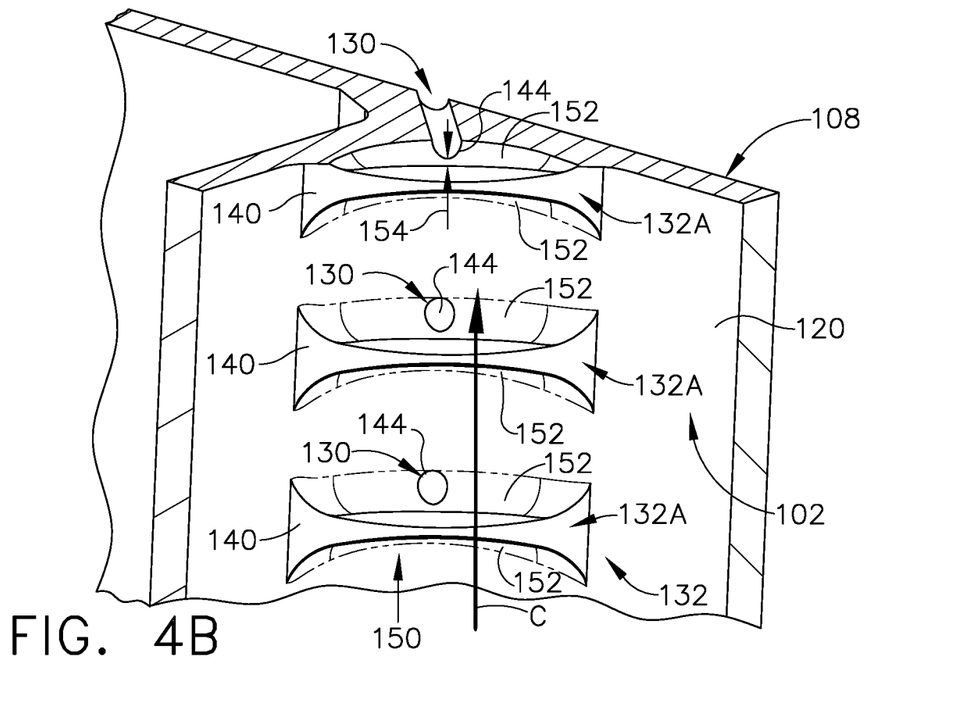
FIG. 4B is a perspective view of a row of the corner deflectors of FIG. 4A.

FIG. 4B illustrates three corner deflectors 132A spaced from three film holes 130. The corner deflectors 132A, or any deflector 132 described herein can be organized into a row 150. While any of the deflectors as described herein can be organized into a row, it should be appreciated that there can only be one discrete deflector for one film hole, multiple film holes for one deflectors, multiple deflectors for a one film hole, or that the deflectors can be organized in any manner as is desirable for the particular airfoil 92 or engine component.

The corner deflectors 132A can have fillets 152 extending from the outer surface 140 to the inner surface 120 of the outer wall 108. The fillets 152 can be positioned radially above or below the outer surface 140, relative to the engine centerline 12 (FIG. 1) or relative to a flow of cooling fluid C passing through the cooling passage 102. The outer surface 140 can be a ramped surface or a curved surface, in non-limiting examples, in order to deflect the flow of air while imparting minimal turbulence to the airflow. The fillets 152 can further minimize turbulence of the flow of cooling fluid C generated by the deflectors 132 within the cooling passage 102, while deflecting the flow of cooling fluid C from near the outer wall 108 toward the outer surface 140 of the deflector 132A. The turbulence can be a substantially non-laminar local flow of the flow of cooling fluid C, such as swirling flow in one example. Additionally, deflecting the flow can include reducing the local velocity of the flow of cooling fluid C. While the deflector 132A is shown as elongated, well beyond the cross-sectional area of the adjacent film hole 130, it should be appreciated that it can be desirable to minimize the size of the deflector 132A, in order to minimize overall component weight. The inlet 144 of the film holes 130 can be provided on the fillets 152. The inlet 144 can be provided partially or wholly on the fillets 152, being downstream of the corner deflector 132A relative to a flow of cooling fluid C passing through the cooling passage 102. Furthermore, it is contemplated that the corner deflector 132A or any deflector 132 described herein may or may not have fillets 152.

Alternatively, the inlet 144 of the film hole 130 need not be provided on the fillet 152. The inlet 144 can be provided on the inner surface 120 of the outer wall 108 and spaced from the corner deflector 132A by a spacing distance 154. The spacing distance 154 can be within ten heights 142 of the deflector 132A as defined in FIG. 4A. Alternative spacing is contemplated, where the spacing distance 154 can be dependent on flow rates, velocities, or the particular geometries of the engine component or the particular cooling passage in non-limiting examples. Similarly, the inlet 144 of the film holes 130 can be positioned relative to the center of the deflector 132A, such as being centered relative to the deflector 132A, or offset relative to the center of the deflector 132A.

Figure 5A:
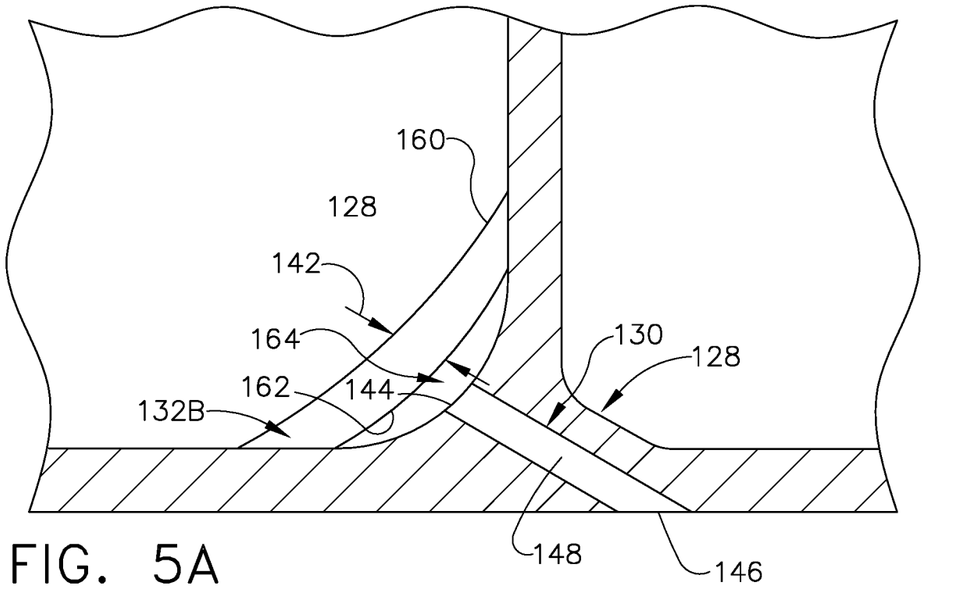
FIG. 5A is a top view of a floating corner deflector with a gap between the floating corner deflector and a corner of the cooling passage of FIG. 3.
Figure 5B:
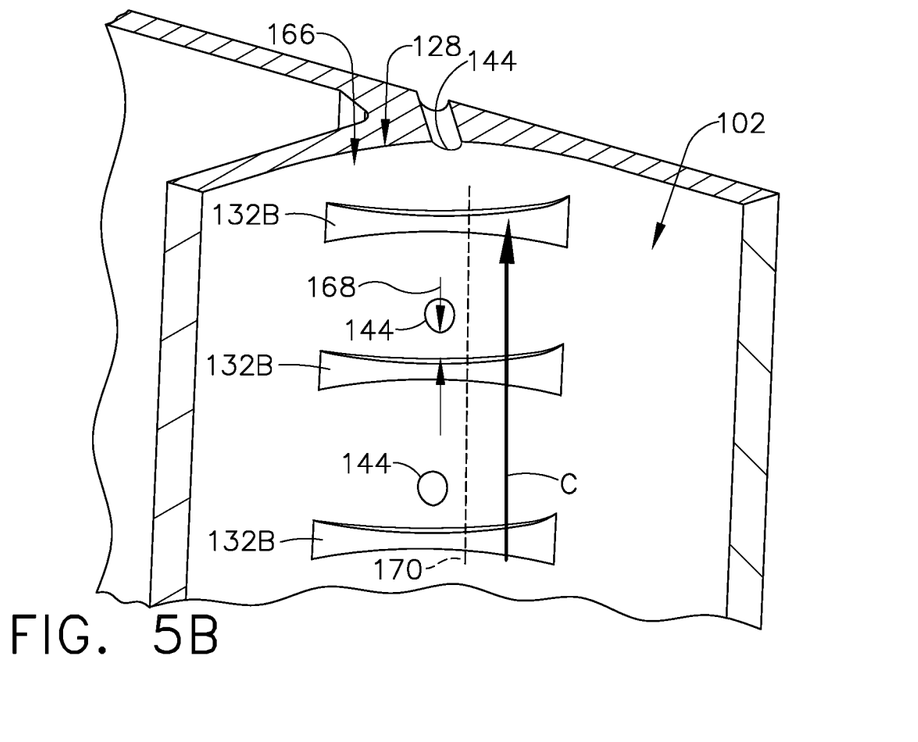
FIG. 5B is a perspective view of a row of the floating corner deflectors of FIG. 5A.

FIG. 5A shows a top-down view of the floating corner deflectors 132B of FIG. 3 and FIG. 5B shows a perspective view of a row of floating corner deflectors 132B of FIG. 3. Referring to FIG. 5A, the floating corner deflector 132B is positioned at the corner 128. The floating corner deflector 132B can have an outer surface 160 and an inner surface 162, relative to the corner 128. The outer surface 160 can be rounded, in one non-limiting example, while it is contemplated that it can be flat, ramped, or angled in additional non-limiting examples the outer surface 160 can be defined as the surface having the greatest distance from the corner 128 and the inner surface 162 can have the smallest distance from the corner 128. As such, it is contemplated that the outer surface 160 and the inner surface 162 can be one continuous surface, such as an example where the floating corner deflector 132B has a substantially cylindrical shape, or a substantially circular profile. The deflector height 142 for the floating corner deflector 132B can be measured as the distance between the outer surface 160 and the inner surface 162. A gap 164 can be measured as the distance between the corner 128 and the inner surface 162. The gap 164 can be between 0.2 and 5 of the deflector heights 142. The film hole 130 includes the inlet 144 and the outlet 146 similar to that of FIGS. 4A and 4B.

The gap 164 should be small enough such that some of the cooling fluid C can pass through the gap 164. As such, the gap 164 should be sized to permit a minimal portion of the cooling fluid flow C to pass over the inlet 144, while the floating corner deflector 132B deflects a greater portion of the cooling fluid flow C from the inlet 144. The gap 164 can provide for decreased temperatures at the floating corner deflector 132B as opposed to the corner deflector 132A of FIGS. 4A-4B, as larger amounts of heat can gather at the greater volume of material, which can decrease component life or decrease the operational temperature that the component can withstand.

FIG. 5B shows three floating corner deflectors 132B arranged in a row 166. The row 166 can be aligned relative to the flow of cooling fluid C. The inlets 144 can be spaced from the floating corner deflectors 132B by a spacing distance 168. In one example, the spacing distance 168 can be measured as the shortest distance between the floating corner deflectors 132B and the inlets 144 relative to the flow of cooling fluid C. In an alternate, non-limiting example, the row 166 of floating corner deflectors 132B can define a row axis 170, and the spacing distance 168 can be measured relative to a projection of the row axis 170 onto the corner 128. In another non-limiting example, the floating corner deflector 132B can be projected onto the corner 128 perpendicular to an axis defined longitudinally through the cooling passage 102. Therefore, it should be appreciated that there are many different method to determining the spacing distance 168. The spacing distance 168 is less than ten of the deflector heights 142 of FIG. 5A measured for the floating corner deflector 132B between the outer and inner surfaces 160, 162.

Figure 6A:
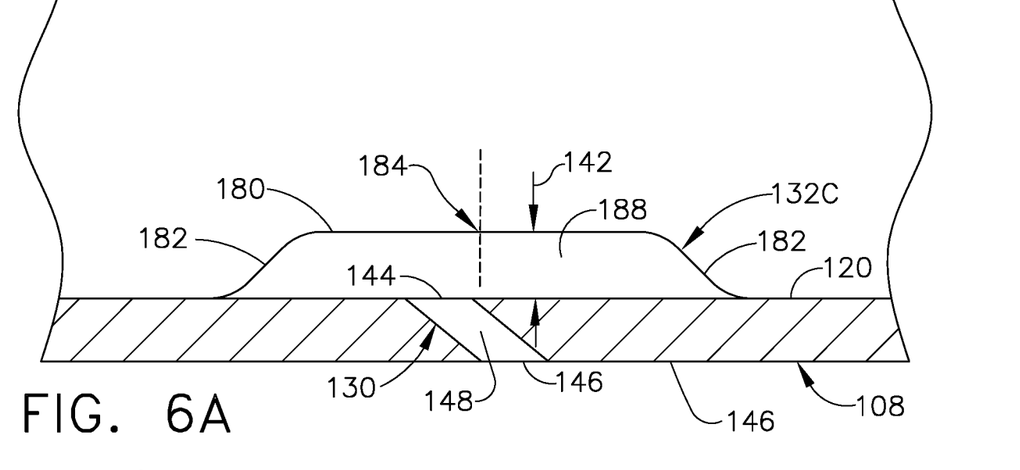
FIG. 6A is a top view of a wall deflector provided along a wall of the cooling passage of FIG. 3.
Figure 6B:
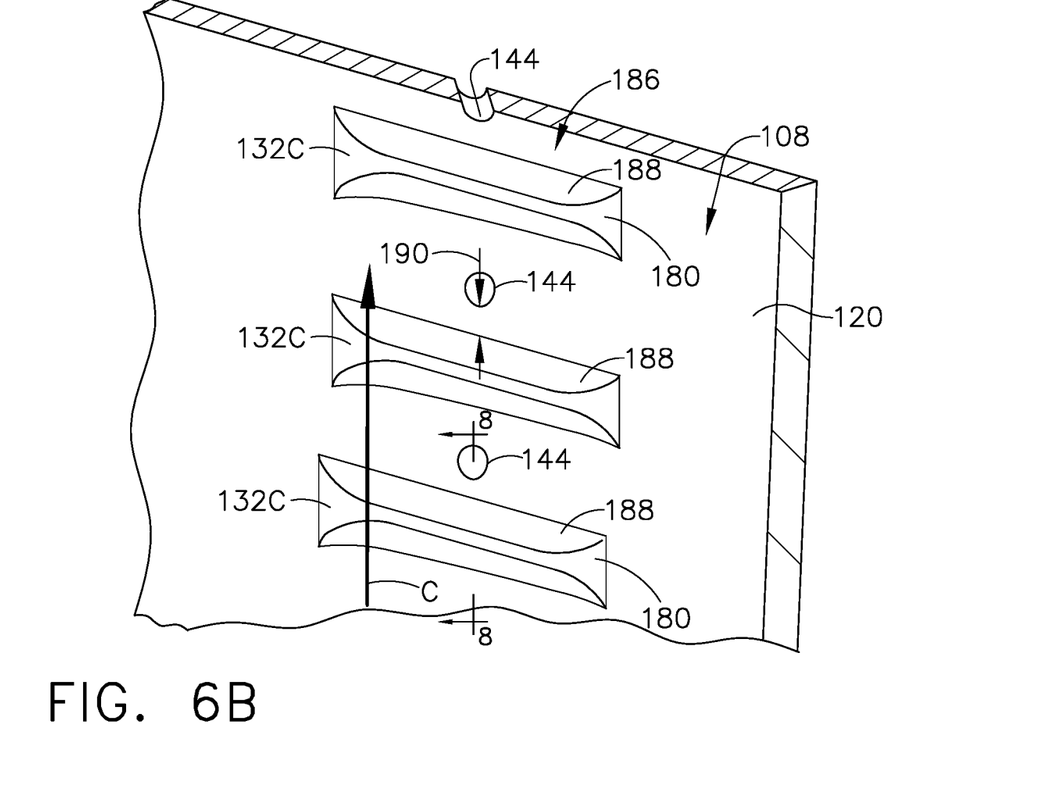
FIG. 6B is a perspective view of a row of wall deflectors of FIG. 6A.

FIG. 6A illustrates a top down view of the wall deflector 132C provided on the outer wall 108 away from a corner and FIG. 6B illustrates a perspective view of three wall deflectors 132C arranged in a row. Referring to FIG. 6A, the wall deflector 132C can be provided along the inner surface 120 of the outer wall 108. The wall deflector 132C can include an outer surface 180 and two opposing ends 182 transitioning from the outer surface 180 to the outer wall 108. A side surface 188 can be provided between the outer surface 180 and the outer wall 108. The side surface 188 can be curved or filleted, similar to the fillets 152 of FIGS. 4A and 4B, while it is contemplated that any such surface of any deflector described herein can be curved or filleted. The wall deflector 132C can include the deflector height 142 defined as the distance between the inner surface 120 of the outer wall 108 and the outer surface 180 of wall deflector 132C, measured perpendicular to the outer wall 108. The wall deflector 132C can include a center 184, measured as the middle of the wall deflector 132C between the opposing ends 182. The film hole 130 can be aligned with the center 184, for example such that the center of the passage 148 is aligned with the center 184. As such, the inlet 144 and the outlet 146 are offset from the center of the wall deflector 132C. Alternatively, it is contemplated that the film hole 130, or the inlet 144, the outlet 146, or the passage thereof 148, can be arranged in any position relative to the wall deflector 132C, such that the inlet 144 is provided between the two ends 182 and spaced downstream from the wall deflector 132C.

Referring to FIG. 6B, a row 186 of wall deflectors 132C are shown provided along the inner surface 120 of the outer wall 108. The wall deflectors 132C can be spaced from the inlets 144 of the film holes 130 by a spacing distance 190. The spacing distance 190 can be ten deflector heights 142 or less, and can be measured as the shortest distance between the inlet 144 and the junction between the side surface 188 and the inner surface 120 of the outer wall 108.

Figure 7:
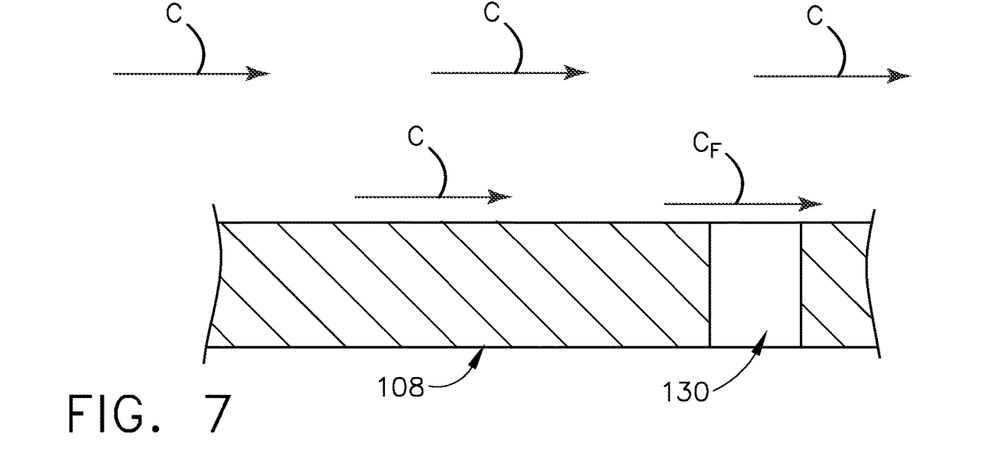
FIG. 7 is an exemplary section view of an airflow passing along the wall of an engine component having a film hole without a deflector.

The wall deflectors 132A-C are beneficial in deflecting a flow of cooling fluid flow C over a film hole 130. The shortened length of the wall deflectors 132C can effectively deflect the flow of cooling fluid C. FIG. 7 illustrates a film hole 130 along an outer wall 108 without a deflector 132A-C as described FIGS. 3-6B. The flow of cooling fluid C passes over the film hole 130 and creates a cross flow CF over the inlet of the film hole 130. The cross flow CF is undesirable, as it can cause swirling and dust collection in the film hole 130, which can negatively impact film hole efficiency.

Figure 8:
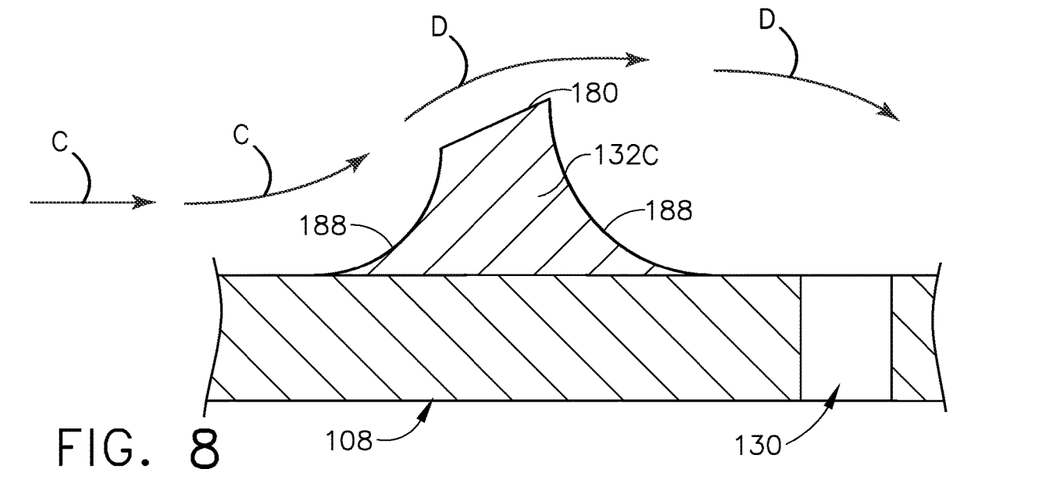
FIG. 8 is a sectional view taken across section 8-8 of FIG. 6B, illustrating an airflow passing along the wall of the airfoil and deflected by the wall deflector.

Referring now to FIG. 8, taken across section 8-8 of FIG. 6B, the outer wall 108 is shown including the wall deflector 132C, which can be representative any deflector as described herein. The outer surface 180 is angled or sloped to define a ramped surface, over which the flow of cooling fluid C can deflect. The angled, sloped, or ramped outer surface 180 provide for deflecting the cooling fluid flow C while generating minimal turbulence in the flow of cooling fluid C being deflected. The side surface 188 are curved or filleted, to smoothly transition between the outer surface 180 and the outer wall 108, in order to further minimize turbulence generated by the wall deflector 132C. In operation, the flow of cooling fluid flow C passes along the outer wall 108 and confronts the deflector 132. The deflector 132 deflects the cooling flow C as a deflected flow D. The deflected flow D is pushed away from the outer wall 108 and away from the film hole 130. The deflected flow D does not pass directly over the film hole 130, preventing the shearing, cross-flow. Preventing the cross-flow over the inlet 144 of the film holes 130 minimizes in-hole swirl and improves film hole efficiency. Furthermore, preventing the cross-flow from passing directly over the film holes 130 minimizes dust collection within the film hole 130, which can improve component lifetime, time-on-wing, and minimize required maintenance, which reduces costs.

While the operation of the deflectors 132 is described in FIG. 8 related to the wall deflectors 132C, it should be appreciated that any deflector described herein can operate in a similar manner, to deflect the cross-flow of the cooling fluid C away from the film holes 130. Furthermore, the deflectors 132 as described herein push the flow of cooling fluid C away from the outer wall 108 while inducing minimal or no turbulence in the flow of cooling fluid C. Turbulence in the flow of cooling fluid can be a flow that is non-laminar, locally. Conversely, a turbulator, as is known, is intended to generate increased turbulence in the flow of cooling fluid. As such, a curved surface or ramped, sloped, or angled surface for the deflector 132 confronting the flow of cooling fluid C is desirable to minimize the amount of turbulence generated.

Figure 9:
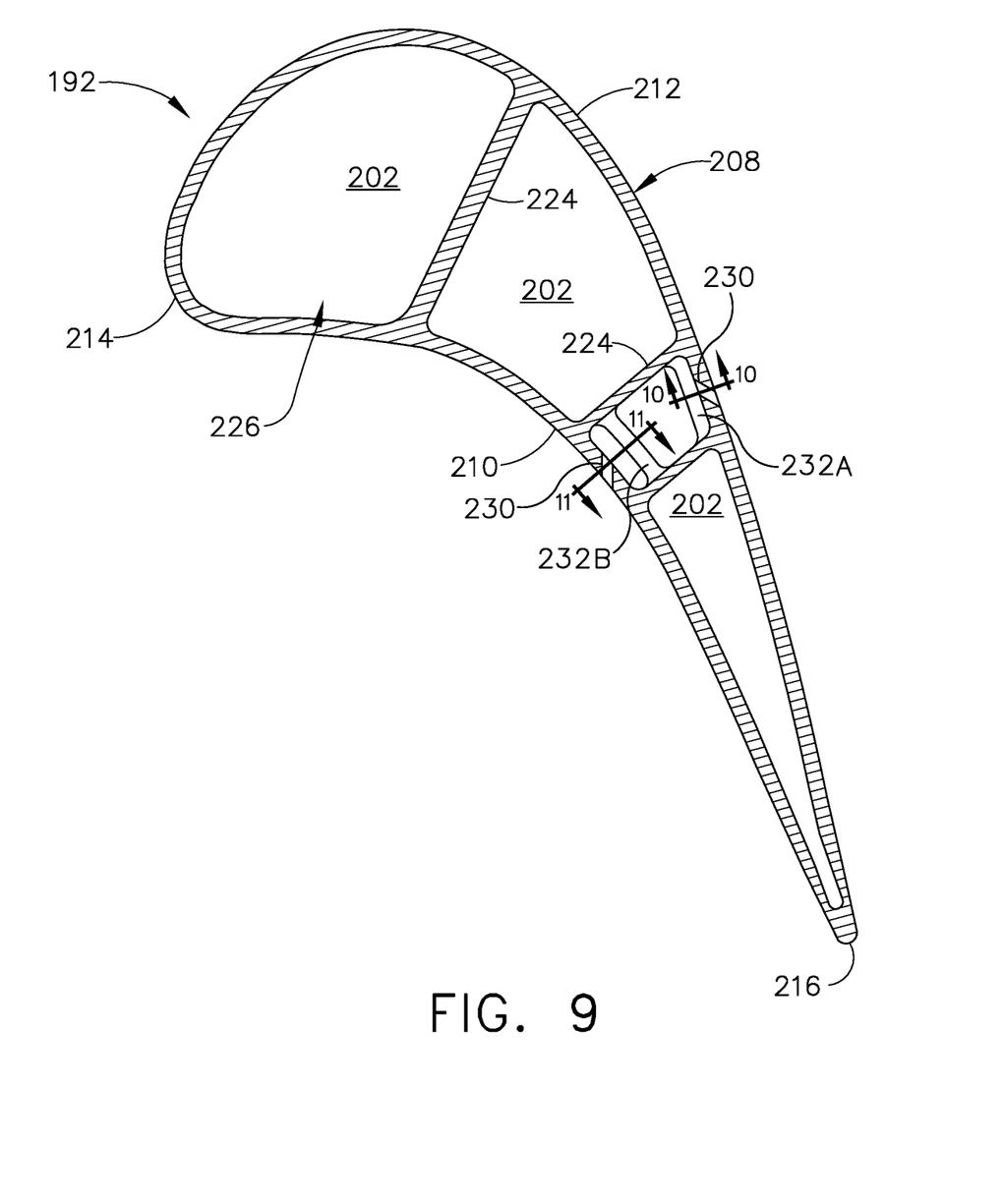
FIG. 9 is a cross-sectional view of an alternative airfoil to that of FIG. 3, illustrating two additional deflector embodiments.

FIG. 9 illustrates a cross-sectional view of another exemplary airfoil 192. The airfoil 192 of FIG. 9 can be substantially similar to the airfoil 92 of FIG. 3. As such, similar numerals will be used to describe similar elements increased by a value of one hundred, and the discussion will be limited to differences between the two airfoils.

A cooling passage 202 within an interior 218 of the airfoil 192 can have one or more deflectors 232 shown as full wall deflectors 232A and floating deflectors 232B. The full wall deflectors 232A can extend fully between two ribs 224 extending between a pressure side 210 and a suction side 212 within the interior 218. Alternatively, the cooling passage 202 can be discretely formed within the interior 218, where the ribs or a similar structure does not span the interior 218.

The full wall deflector 232A extends fully between the two ribs 224 along an inner surface 220 of the outer wall 208, while the floating deflector 232B is spaced from the inner surface 220, extending between the ribs 224. A film hole 230 is positioned adjacent the deflectors 232 for exhausting a cooling fluid from the cooling passage 202 to the exterior outer surface 222 of the airfoil 192.

Figure 10:
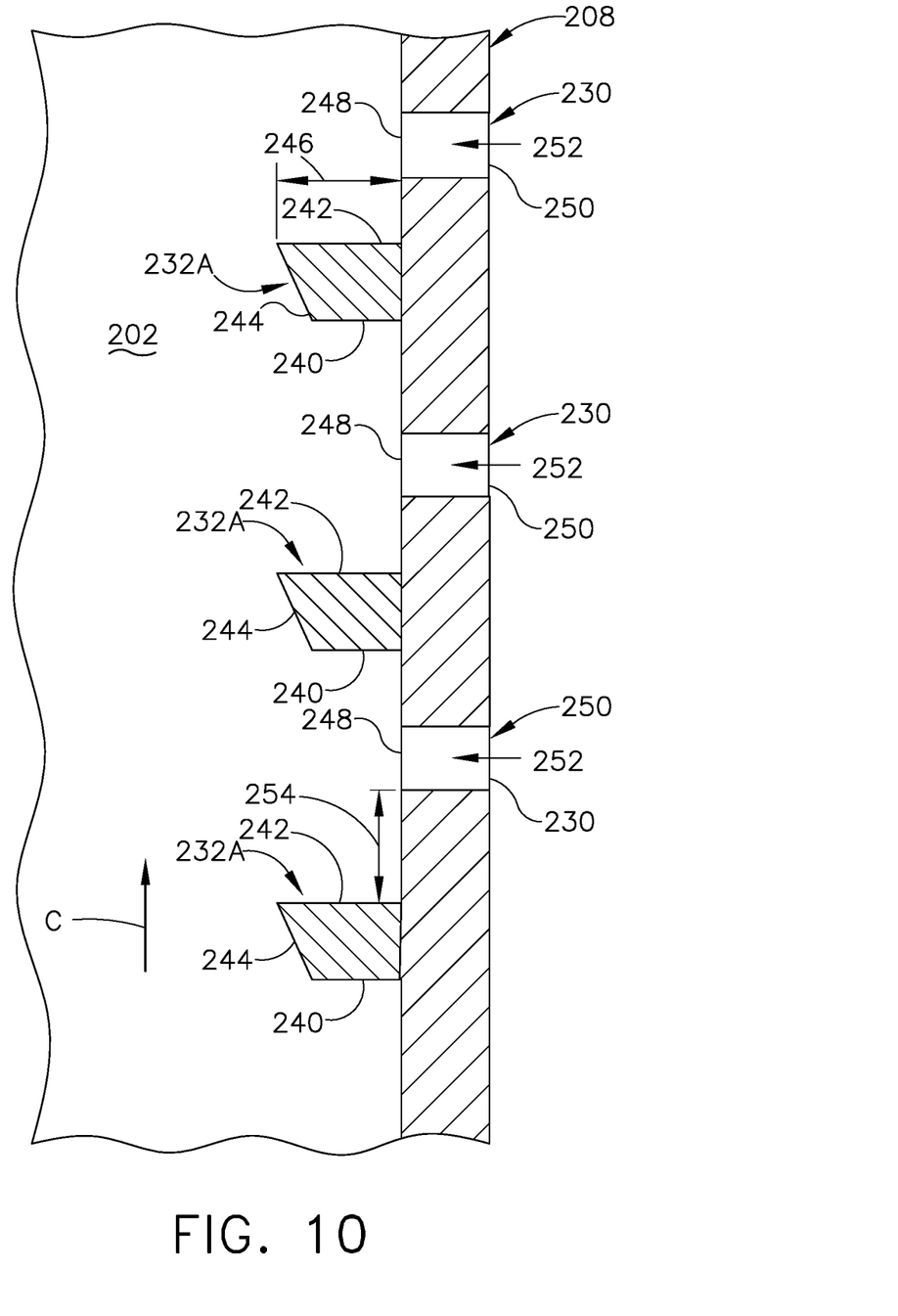
FIG. 10 is side, sectional view taken along section 10-10 of FIG. 9, showing deflectors mounted to the inner wall of the airfoil of FIG. 6.

Referring now to FIG. 10, a cross section of the full wall deflector 232A of FIG. 9 taken across section 10-10 is shown. The full wall deflector 232A can include a front surface 240 facing a flow of cooling fluid passing through the cooling passage 202, a rear surface 242 facing away from the flow of cooling fluid C, and an outer surface 244. The outer surface 244 can be a ramped surface, with the ramp confronting the flow of cooling fluid C. In alternative examples, the outer surface 244 can be flat or curved. In the example where the outer surface 244 is curved, the outer surface 244 and the front and rear surfaces 240, 242 would be continuous. The full wall deflector 232A can define a deflector height 246 as greatest the distance between the outer wall 208 and the furthest extent of the outer surface 244, in a direction substantially perpendicular to the outer wall 208.

The film hole 230 can have an inlet 248 provided on the inner surface 220 and an outlet 250 provided on the outer surface 222, with a passage 252 coupling the inlet 248 to the outlet 250. The film hole 230 can be positioned downstream of the deflectors 232 relative to the flow of cooling fluid C and the inlet 248 can be spaced from the rear surface 242 by a spacing distance 254. The spacing distance 254 can be less than ten deflector heights, in one non-limiting example.

Figure 11:
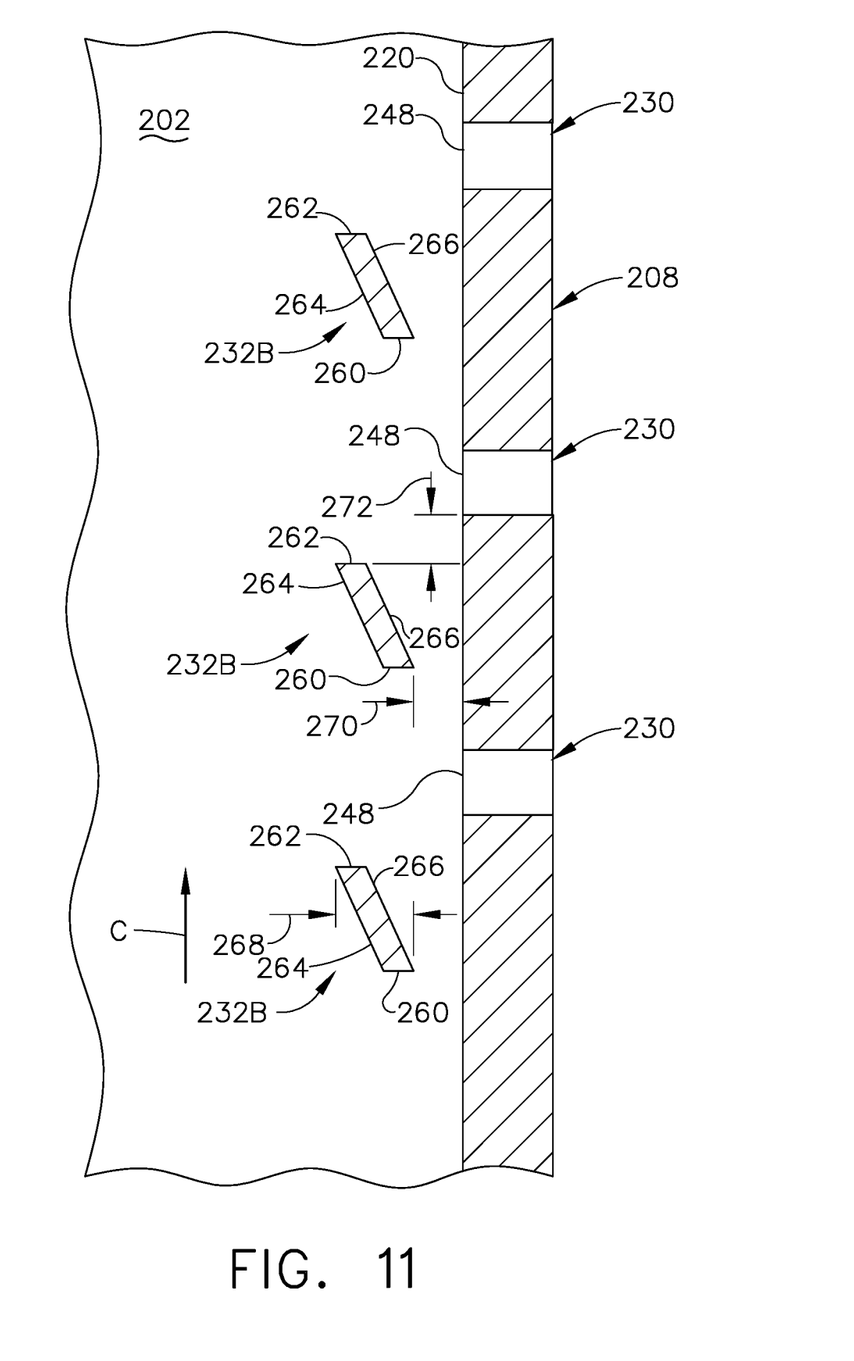
FIG. 11 is a side, sectional view taken along section 11-11 of FIG. 9, showing floating deflectors spaced from the inner wall of the airfoil of FIG. 6.

Referring to FIG. 11, a cross section of the floating deflector 232B of FIG. 7 taken across section 11-11 is shown. The floating deflector 232B as shown includes a rhombus-shaped profile, while any profile shape is contemplated, such as quadrilaterals, circles, ovals, triangles, or other geometric shapes in non-limiting examples. The floating deflectors 232B includes a front surface 260 and a rear surface 262, with a first side surface 264 facing away from the outer wall 208 and a second side surface 266 facing the outer wall 208. The first side surface 264 can be angled to create a ramped surface relative to the flow of cooling fluid C passing through the cooling passage 202. The particular angle of the ramped surface of the first side surface 264 can be tailored to deflect the flow of cooling fluid C, while minimizing turbulence.

The floating deflector 232B can have a deflector thickness 268. The deflector thickness 268 can be measured as the greatest distance of the floating deflector 232B extending perpendicular to the outer wall 208. Alternatively, the deflector thickness 268 can be the thickness of the floating deflector 232B, as the distance between the first and second side surface 264, 266. It should be appreciated that the height of the floating deflector 232B can be measured in a number of additional different ways, such as axially, radially, along the longitudinal length of the cooling passage 202, or relative to the local flow of cooling fluid in non-limiting examples.

The floating deflector 232B is spaced from inner surface 220 of the outer wall 208 by a gap 270. The gap 270 should be sized such that only a minimal amount of cooling fluid C can pass through the gap 270. The size of the gap 270 is small enough such that the majority of the cooling fluid C passing along the inner surface 220 of the outer wall 208 is diverted over the deflector 232B, away from the film hole 230.

The floating deflector 232B is spaced from the inlet 248 by a spacing distance 272. A deflector height can be defined as the combination of the deflector thickness 268 and the gap 270, measured perpendicular to the inner surface 220. The spacing distance 272 can be measured, for example, parallel to the flow of cooling fluid passing through the cooling passage 202. The spacing distance 272 can be less than ten deflector heights, in one non-limiting example. Alternatively, the space 272 can be measured as the shortest distance between the floating deflector 232B and the inlet 248. Additionally, the gap 270 can be less than one half, or 50%, of the deflector height, as defined as the combination of the thickness 268 and the gap 270. As such, the gap 270 should be smaller than the thickness 268. In another non-limiting example, the gap 270 can be less than 30% of the deflector height.

In operation of the airfoil as shown in FIGS. 3-11, the flow of cooling fluid C passing over the film holes 130, 230 can cause a shearing effect as a cross-flow over the inlets 144, 248, and can cause in-hole swirl. The deflectors 132A-C, 232A-B deflect the cooling flow C upstream of the inlet 144, 248 of the film holes 130, 230 to deflect the flow of cooling fluid C such that the cooling fluid flow C does not pass directly over the film hole 130, 230, preventing the shearing, cross-flow. Preventing the cross-flow over the inlet 144, 248 of the film holes 130, 230 minimizes in-hole swirl. Reducing the in-hole swirling improves film hole operation. Furthermore, preventing the cross-flow from passing directly over the film holes 130, 230 minimizes dust collection within the film hole 130, 230, which can improve component lifetime, time-on-wing, and minimize required maintenance, which reduces costs.

A method of reducing cross-flow at a film hole from an airflow in a component for a turbine engine can include deflecting the airflow with a deflector upstream of an inlet of the film hole relative to a flow direction of the airflow to decrease the velocity of the flow of cooling fluid passing over the inlet of the film hole. The component can be an airfoil as described herein, or can be any other engine component utilizing film hole cooling, such as a vane, shroud, or combustor liner in non-limiting examples. The airflow can be the cooling fluid flow C, as described herein. Deflecting the airflow with a deflector can include positioning any of the deflectors as described herein upstream of a film hole, such as the deflectors 132A-C, 232A-B of FIGS. 3-11.

The method can include wherein deflecting the flow of cooling fluid reduces the velocity of the flow of cooling fluid passing over the inlet of the film hole to less than 50% of the mean velocity of the cooling fluid passing through the film hole. A volume of the flow of cooling fluid enters the inlet of the film hole and is exhausted from the film hole. That flow of cooling fluid can have a mean velocity while within the film hole passage. As such, the cross-flow passing over the inlet of the film hole can have a velocity that is less than half of the mean velocity within the film hole passage.

The method can further include deflecting the airflow wherein the deflecting by the deflector occurs within ten heights of the deflector. The deflector can have a deflector height, as described herein. The deflector should be positioned within ten deflector heights in order to effectively deflect the airflow from the film hole. The method can further include a deflector wherein the film hole extends partially through the deflector. The method can further include reducing dust collection within the film hole.

It should be appreciated that the deflectors as described herein blocks a flow of air from creating a shearing cross-flow over a film hole. Blocking the shearing cross-flow can improve film hole effectiveness, while minimizing dust collection within the film hole. As such, the deflectors can improve component and engine efficiency, while further improving component lifetime, time-on-wing, and minimizing maintenance.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
   an outer wall bounding an interior, the outer wall defining a pressure side and a suction side extending axially between a leading edge and a trailing edge defining a chord-wise direction and extending radially between a root and a tip defining a span-wise direction;
   a rib extending from the outer wall into the interior;
   a cooling passage located in the interior, the cooling passage at least partially defined by the rib and the outer wall, and the cooling passage at least partially defining a cooling circuit having a flow direction;
   a film hole extending through the outer wall; and
   a deflector provided in the cooling passage, wherein the deflector is spaced from the outer wall and wherein the deflector defines a deflector height;
   wherein the film hole is spaced from the deflector by a spacing distance within ten deflector heights of the film hole relative to the flow direction through the cooling passage.

2. The airfoil of claim 1 wherein the film hole further comprises multiple film holes extending through the outer wall, and wherein the deflector comprises multiple deflectors, arranged alternating with the multiple film holes extending along the cooling passage.

3. The airfoil of claim 2 wherein each film hole of the multiple film holes is provided within the spacing distance of a corresponding deflector of the multiple deflectors.

4. The airfoil of claim 1 wherein a spacing of the deflector from the outer wall is less than 30% of the deflector height.

5. A method of cooling an airfoil for a turbine engine, the method comprising:
   providing a volume of air to a cooling passage within an interior of the airfoil, the interior defined by an outer wall, and the cooling passage at least partially defined by the outer wall, a first rib extending into the interior from the outer wall;
   deflecting, with a deflector, the volume of air within the cooling passage; and
   exhausting the deflected volume of air via a film hole;
   wherein the deflector extends from the rib and is spaced from the outer wall, wherein the deflector defines a deflector height, and wherein the film hole is spaced from the deflector by a spacing distance within ten deflector heights of the film hole relative to a flow direction for the volume of air through the cooling passage.

6. A component for a turbine engine, the component comprising:
a wall at least partially bounding an interior;
a first rib extending from the wall into the interior and defining a corner at a junction between the first rib and the wall;
a second rib extending from the wall into the interior, and spaced from the first rib;
a cooling passage extending along the wall at least partially defined by the wall and the first rib;
a film hole extending through the wall; and
a deflector positioned in the cooling passage, wherein the deflector extends between the first rib and the wall, wherein the deflector is spaced from the second rib, and wherein the deflector is spaced from the corner by a gap.

7. The method of claim 5 wherein a spacing of the deflector from the outer wall is less than 30% of the deflector height.

8. The component of claim 6 wherein the deflector defines a deflector height, and wherein the gap is less than 30% of the deflector height.

9. The method of claim 5 wherein exhausting the deflected volume of air via the film hole further comprises exhausting the deflected volume of air via multiple film holes extending through the outer wall.

10. The method of claim 9 wherein deflecting the volume of air within the cooling passage further comprises deflecting the volume of air with multiple deflectors.

11. The method of claim 10 wherein the multiple deflectors are arranged alternating with the multiple film holes extending along the cooling passage.

12. The component of claim 6 wherein the deflector comprises multiple deflectors positioned in the cooling passage, and each deflector of the multiple deflectors includes a deflector height.

13. The component of claim 12 further comprising multiple film holes, and wherein each film hole of the multiple film holes is provided within a spacing distance of a corresponding deflector of the multiple deflectors.

14. The component of claim 13 wherein the spacing distance is less than ten deflector heights.

15. The airfoil of claim 1, wherein the deflector extends from the rib.

* * * * *